United States Patent
Cao et al.

(10) Patent No.: US 12,548,295 B2
(45) Date of Patent: Feb. 10, 2026

(54) QUICK AND INTELLIGENT IR7-EC NETWORK BASED CLASSIFICATION METHOD FOR CONCRETE IMAGE CRACK TYPE

(71) Applicants: Hohai University, Nanjing (CN); JSTI GROUP, Nanjing (CN); Jiangsu Dongjiao Intelligent Control Technology Group Co., Ltd., Nanjing (CN)

(72) Inventors: Maosen Cao, Nanjing (CN); Ronghua Fu, Nanjing (CN); Yufeng Zhang, Nanjing (CN); Jie Wang, Nanjing (CN); Dragoslav Sumarac, Nanjing (CN); Xiangdong Qian, Nanjing (CN); Li Cui, Nanjing (CN); Kai Zhu, Nanjing (CN)

(73) Assignees: Hohai University, Nanjing (CN); JSTI GROUP, Nanjing (CN); Jiangsu Dongjiao Intelligent Control Technology Group Co., Ltd., Nanjing (CN)

( * ) Notice: Subject to any disclaimer, the term of this patent is extended or adjusted under 35 U.S.C. 154(b) by 267 days.

(21) Appl. No.: 18/203,080

(22) Filed: May 30, 2023

(65) Prior Publication Data
US 2024/0029402 A1   Jan. 25, 2024

(30) Foreign Application Priority Data
Jul. 20, 2022   (CN) .......................... 202210857092.X (51) Int. Cl.
*G06V 10/764* (2022.01)
*G06V 20/00* (2022.01)

(52) U.S. Cl.
CPC ............ *G06V 10/764* (2022.01); *G06V 20/00* (2022.01)

(58) Field of Classification Search
CPC .......................... G06V 10/764; G06V 20/00
See application file for complete search history.

(56) References Cited

U.S. PATENT DOCUMENTS

| 2019/0164290 A1* | 5/2019 | Wang | G06N 5/046 |
| 2019/0266418 A1* | 8/2019 | Xu | G06V 10/764 |

FOREIGN PATENT DOCUMENTS

| CN | 110321815 A | * 10/2019 | G06N 3/08 |
| CN | 112257794 A | *  1/2021 | G06F 18/241 |

* cited by examiner

*Primary Examiner* — Pinalben Patel
(74) *Attorney, Agent, or Firm* — Nitin Kaushik (57) ABSTRACT

An intelligent method for efficiently classifying concrete cracks from large amounts of image data is proposed, named inverted residual (IR) 7-Efficient Channel Attention and Convolutional Block Attention Module (EC) network. The IR7-EC network consists of a convolutional layer, seven inverted residual-ECA structures, a CBAM attention mechanism, a pooling layer, and multiple fully connected layers that are sequentially connected. The inverted residual-ECA structure consists of two components: a depthwise separable convolution-based inverted residual structure and an ECA attention mechanism. The new inverted residual structure facilitates the feature extraction of concrete cracks. Compared to conventional network structures like VGG and Resnet, the proposed IR7-EC network excels in both accuracy and efficiency. Once the IR7-EC network is fully trained, it can accurately classify various types of concrete cracks in captured images. This method offers several advantages, including a small number of network parameters, fast training convergence speed, and precise classification results.

6 Claims, 9 Drawing Sheets

Traditional inverted residual structure

FIG. 4A

Inverted residual structure in the patent

Training set precision

FIG. 7A

Training set loss

FIG. 7B

Validation set precision

FIG. 7C

Validation set loss

QUICK AND INTELLIGENT IR7-EC NETWORK BASED CLASSIFICATION METHOD FOR CONCRETE IMAGE CRACK TYPE

CROSS REFERENCE TO THE RELATED APPLICATIONS

This application is based upon and claims priority to Chinese Patent Application No. 202210857092.X, filed on Jul. 20, 2022, the entire contents of which are incorporated herein by reference.

TECHNICAL FIELD

The present invention pertains to the technical field of classifying types of concrete cracks based on inverted residual (IR) 7-ECA and CBAM (EC) networks. Specifically, it focuses on a fast and intelligent classification method for vision-based concrete crack type classification.

BACKGROUND

Concrete structures such as bridges, dams, and other civil infrastructures are susceptible to degradation and damage during operation. This can have a significant impact on safety, making it crucial to diagnose potential damage. The advancement of unmanned aerial vehicle and wireless transmission technologies has enabled the efficient collection of mass data on concrete structures. This serves as a basis for the development of intelligent classification. Compared to traditional methods for classifying structural damage, vision-based deep learning technology offers several advantages. It is highly efficient, precise, and objective when it comes to classifying cracks.

Deep learning neural network is widely used to solve multi-classification problems in the computer field. Its purpose was to create a universal and efficient network that could be applied in various scenarios with high precision. However, when this type of network is used for classifying concrete cracks, it only needs to classify up to ten different types of cracks. As a result, using the universal network can lead to parameter redundancy and waste of training time and hardware memory. Therefore, it is necessary to develop a special neural network for classifying concrete cracks, with light weight, high network convergence speed, and high classification precision.

SUMMARY

In order to solve the above problems, the present invention provides a crack type classification method based on an inverted residual (IR) 7-ECA and CBAM (EC) network model special for mass concrete image crack classification.

A quick and intelligent IR7-EC network based classification method for a concrete image crack type includes the following steps:
  integrating attention mechanisms, inverted residual blocks, pooling layers, and fully connected layers through precisely configured structural quantities, combinations, and connections:
  the 1st layer includes a convolutional layer with a convolutional kernel of 3×3, a batch normalization layer, and a hardswish activation function, a step size being 2, the number of input channels being 3, and the number of output channels being 16;
  from the 2nd layer to a the 8th layer is seven inverted residual-ECA structures, and each layer specifically includes four parts:
    (i) a convolutional layer with a convolutional kernel of 1×1, a batch normalization layer, and an ReLU6 activation function;
    (ii) a convolutional layer with a convolutional kernel of 3×3, a batch normalization layer, and an ReLU6 activation function;
    (iii) an ECA attention mechanism, a structure of which includes an average pooling layer, a convolutional layer with a convolutional kernel of 1×1, and a sigmoid function; and
    (iv) convolutional layer with a convolutional kernel of 1×1, a batch normalization layer, and a linear activation function;
  the 9th layer includes a convolutional layer with a convolutional kernel of 3×3, a batch normalization layer and a hardswish activation function, a step size being 1, the number of input channels being 96, and the number of output channels being 576;
  the 10th layer is the CBAM attention mechanism and specifically includes two parts:
    (i) a channel attention mechanism, which includes an average pooling layer, a maximum pooling layer, the fully connected layer 1, an ReLU6 activation function, the fully connected layer 2, and a sigmoid function; and
    (ii) space attention mechanism, which includes an average pooling layer, a maximum pooling layer, a convolutional layer with a convolutional kernel of 7×7, and a sigmoid function;
  the 11th layer is an average pooling layer;
  the 12th layer is a one-dimensional convolutional layer, a hardswish activation function, and a dropout layer with a sparsity ratio of 0.2; and
  the 13th is a one-dimensional convolutional layer.
  a 13th is a one-dimensional convolutional layer.
  Preferably, training of the IR7-EC network model includes the following steps:
    collecting crack images, establishing an image data set of different crack types, and conducting pre-processing;
    inputting a pre-processed image data set into the 1st layer, and conducting preliminary feature extraction, data normalization and nonlinear transformation on image sample data sequentially through the convolutional layer, the batch normalization layer and the hardswish activation function;
    inputting a feature preliminarily extracted through the 1st layer into the 2nd layer to the 8th layer, making the feature sequentially pass the 7 inverted residual-ECA structures, inputting the feature into the first part of the inverted residual-ECA structure for processing so as to augment a dimension of an input data channel, inputting data after channel dimension augmentation into the second part so as to conduct deep feature extraction, inputting data after deep feature extraction into the third part, highlighting some channels with higher network precision by weighting network channels through the ECA attention mechanism, so as to obtain the enhanced concrete crack feature extraction map, inputting the enhanced concrete crack feature extraction map into the fourth part so as to reduce a dimension of a data channel, and making the data pass all the inverted residual-ECA structures sequentially according to similar operations;
    inputting the data obtained through the 2nd layer to the 8th layer into the 9th layer for feature extraction;

inputting data after feature extraction through the 9th layer into the CBAM attention mechanism of the 10th layer, and further conducting feature extraction at a channel and space level on the data, so as to obtain a feature extraction map containing more crack information;

inputting the feature extraction map obtained through the 10th layer into the 11th layer, the 12th layer and the 13th layer sequentially so as to conduct data dimension reduction and two-dimensional to one-dimensional transformation, and classifying an input concrete crack image according to extracted one-dimensional crack image feature information, so as to output an classification result; and comparing the classification result obtained through the 12th layer and a true result, computing an error through a loss function, and updating a network parameter through an optimization function until a network is fitted.

Preferably, normalization of the batch normalization layer specifically includes:

$$\mu_B = \frac{1}{m}\sum_{i=1}^{m} x_i$$

$$\sigma_B^2 = \frac{1}{m}\sum_{i=1}^{m}(x_i - \mu_B)^2$$

$$\hat{x}_i = \frac{x_i - \mu_B}{\sqrt{\sigma_B^2 + \epsilon}}$$

$$y_i \leftarrow \gamma \hat{x}_i + \beta$$

where $x_i$ is a feature map before input into batch normalization, $y_i$ is a feature map after output from batch normalization, m is the number of feature maps input into the layer in a current training batch, and $\gamma$ and $\beta$ are variables that change with update of a network gradient;

data passing the ReLU6 activation function is processed nonlinearly through the following formula:

$$f(x_i) = \min(\max(x_i, 0), 6)$$

where $x_i$ is a feature map before input into the ReLU6 activation function, and $f(x_i)$ is a feature map after output from the ReLU6 activation function; and data passing the hardswish activation function is processed nonlinearly through the following formula:

$$Hardswish(x) = \begin{cases} 0 & \text{if } x \leq -3 \\ x & \text{if } x \geq +3 \\ x \cdot (x+3)/6 & \text{otherwise} \end{cases}$$

where x is a feature map before input into the hardswish activation function, and f(x) is a feature map after output from the hardswish activation function.

Preferably, the highlighting some channels with higher network precision by weighting network channels through the ECA attention mechanism, so as to obtain the enhanced concrete crack feature extraction map includes the following step:

conducting cross-channel interaction on data passing the ECA attention mechanism in each layer, so as to obtain the enhanced concrete crack feature extraction map, by using the following formula:

$$k = \psi(C) = \left|\frac{\log_2(C)}{\gamma} + \frac{b}{\gamma}\right|_{odd}$$

$$E_s(F) = \sigma(f^{k*k}[AvgPool(F)])$$

where $|t|_{odd}$ represents a nearest odd t; C is the number of channels of data input into the ECA attention mechanism, and $\gamma$ and B are two hyper-parameters, $\gamma$ being 2, and b being 1; and $E_s(F)$ is the ECA attention mechanism, $\sigma$ is a sigmoid operation, $f^{k*k}[\bullet]$ represents a convolutional operation of k*k, F is an input feature map, and AvgPool( ) is average pooling.

Preferably, the inputting data after feature extraction through the 9th layer into the CBAM attention mechanism of the 10th layer, and further conducting feature extraction at a channel and space level on the data, so as to obtain a feature extraction map containing more crack information includes the following steps:

using average pooling and maximum pooling to aggregate space information of feature mapping, compressing a space dimension of an input feature map, and conducting summation and merging element by element, so as to generate a channel attention map, through the following formula:

$$M_c(F) = \sigma(MLP(AvgPool(F)) + MLP(MaxPool(F)))$$

where $M_c$ represents channel attention, MLP( ) is composed of the fully connected layer 1, the ReLU6 activation function, and the fully connected layer 2, $\sigma$ is a sigmoid operation, F is an input feature map, AvgPool( ) is average pooling, MaxPool( ) is maximum pooling, and $M_s$ represents the space attention mechanism; and using average pooling and maximum pooling to compress the input feature map in a space attention module, so as to obtain the feature extraction map containing more crack information through the following formula:

$$M_s(F) = \sigma(f^{7*7}[AvgPool(F), MaxPool(F)])$$

where $M_s$ represents the space attention mechanism, $\sigma$ is a sigmoid operation, $f^{7*7}[\bullet]$ represents a convolutional operation of 7*7, F is an input feature map, AvgPool( ) is average pooling, and MaxPool( ) is maximum pooling.

Preferably, the method further includes:

conducting sparsification on data passing the dropout layer in each layer, so as to avoid network over-fitting through the following formulas:

$$r_j^{(l)} \sim Bernoulli(p)$$

$$\tilde{y}^{(l)} = r^{(l)} * y^{(l)}$$

where a Bernoulli(p) function is used to generate a vector of a probability $r_j^{(l)}$, such that a neuron stops working with probability p, $y^{(l)}$ is an upper layer of an output feature map, and $\tilde{y}^{(l)}$ is a feature map output after passing the dropout layer.

Preferably, the computing an error through a loss function includes the following step:

computing loss of a network through the following formula:

$$Loss(y_{o,c}, p_{o,c}) = -\sum_{c=1}^{M} y_{o,c} \log(p_{o,c})$$

where Loss($y_{o,c}$, $p_{o,c}$) is a loss function between a network predicted value and a true value, M is the number of classes, 7 and $y_{o,c}$ are true values, and $p_{o,c}$ is the network predicted value.

Preferably, the method further includes:

optimizing internal parameters of a network through the following formulas:

$$f(\theta) = \text{Loss}(y_{o,c}, p_{o,c})$$

$$g_t = \nabla_\theta f_t(\theta_{t-1})$$

$$m_t = \beta_1 \cdot m_{t-1} + (1-\beta_1) \cdot g_t$$

$$v_t = \beta_2 \cdot v_{t-1} + (1-\beta_2) \cdot g_t^2$$

$$\hat{m}_t = m_t/(1-\beta_1^t)$$

$$\hat{v}_t = v_t/(1-\beta_2^t)$$

$$\theta_t = \theta_{t-1} - \alpha \cdot \hat{m}_t/(\sqrt{\hat{v}_t} + \in)$$

where Loss($y_{o,c}$, $p_{o,c}$) is a loss function between a network predicted value and a true value, $\theta$ is a parameter to be updated in a model, $g_t$ is a gradient obtained by conducting derivation on $\theta$ of the loss function $f(\theta)$, $\beta_1$ is a first-order moment attenuation coefficient, $\beta_2$ is a second-order moment attenuation coefficient, $m_t$ is an expectation of the gradient $g_t$, $v_t$ is an expectation of $g_t^2$, $\hat{m}_t$ is an offset correction of $m_t$, $\hat{v}_t$ is an offset correction of $v_t$, $\theta_{t-1}$ is a parameter before network update, and $\theta_t$ is a parameter after network update.

The present invention has the beneficial effects:

According to the present invention, based on the inverted residual structure and other machine vision algorithms, the IR7-EC network model special for mass concrete image crack classification is created. Compared with a current popular network of computer vision, the IR7-EC network model has a smaller number of parameters and shorter training time, and maintains higher concrete crack classification precision.

The present invention avoids disadvantages such as parameter redundancy, long training time and large hardware memory occupation of current general classification networks of alexnet, vgg16, resnet50, Google net and mobilenet_v3_large, has characteristics and advantages such as a small number of network model parameters, a high training convergence speed and high concrete crack classification precision, forms a special model for intelligently and efficiently classifying cracks from concrete image big data, and has great engineering application potential.

DETAILED DESCRIPTION OF THE EMBODIMENTS

For making objectives, technical solutions and advantages of the present invention clearer, the present invention will be described in further detail below in conjunction with the accompanying drawings and examples. It should be understood that specific examples described herein are merely used to explain the present invention, and are not used to limit the present invention.

Example 1

The present invention provides a quick and intelligent inverted residual (IR) 7-ECA and CBAM (EC) network based classification method for a concrete image crack type. A flow diagram of using an IR7-EC network to classify concrete crack is as shown in FIG. 1.

TABLE 1

| Computer platform and environment configuration implemented in the example | |
|---|---|
| Hardware and software platform | Type parameter |
| Operation system | Windows 10 |
| CPU | Intel(R) Xeon(R) Gold 5222 CPU @ 3.80 GHz 3.79 GHz |
| GPU | NVIDIA Quadro P2200 |
| Internal storage | 64.0 GB |
| Programming environment | Anaconda3 CUDA10.2 Python3.6 pytorch |

Figure 1:
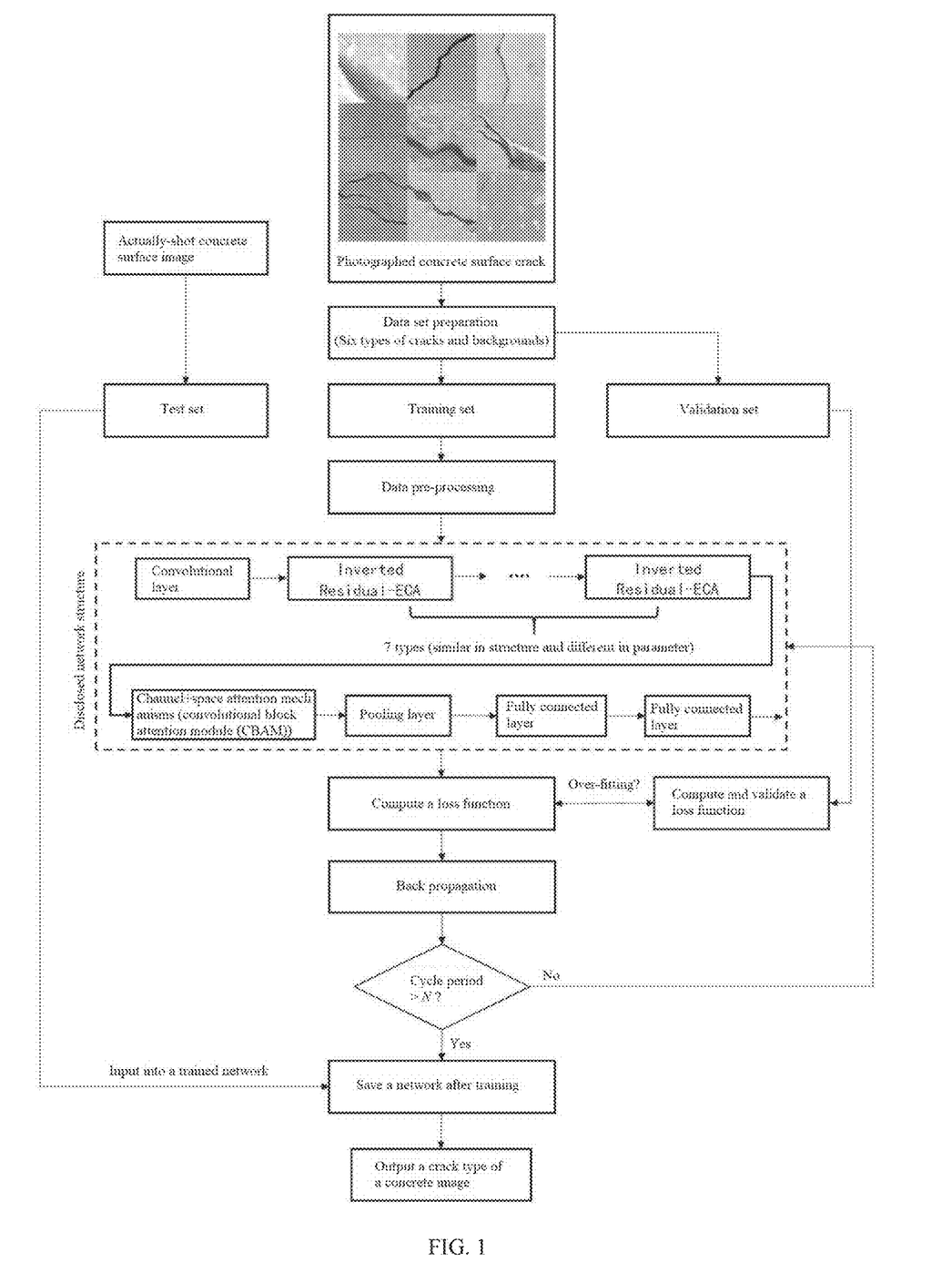
FIG. 1 is a flow diagram of using an inverted residual (IR) 7-ECA and CBAM (EC) network to classify a concrete crack according to Example 1 of the present invention.

With reference to FIG. 1, the present invention provides an IR7-EC network model special for mass concrete image crack classification, which specifically includes the following steps:

step 1, crack images are collected, and a crack type classification image data set is established, where the crack type classification image data set includes a crack type classification image training set and validation set;

step 2, an image to be input into a neural network model is pre-processed;

step 3, the neural network model is built by fusing a machine vision algorithm on the basis of an inverted residual structure, image sample data is input into the neural network model so as to train the neural network model until a neural network reaches a converged state, and the network model is saved; and step 4, a concrete crack image to be detected is input into a trained neural network, so as to obtain a type of a concrete crack in a concrete crack image.

Figure 2:
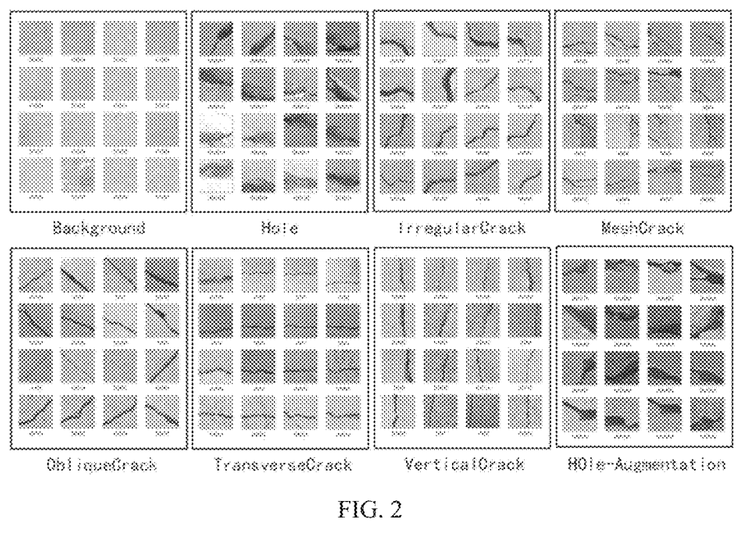
FIG. 2 shows schematic diagrams of 7 types of concrete crack images according to Example 1 of the present invention.
Figure 3:
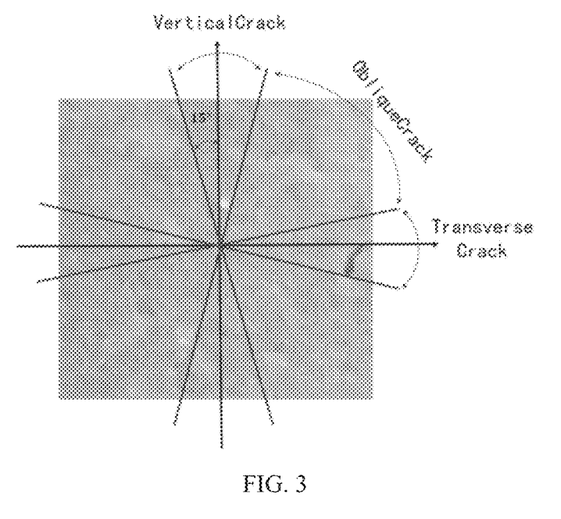
FIG. 3 shows an evaluation criterion of crack types of a transverse crack, a vertical crack and an oblique crack of concrete according to Example 1 of the present invention.

Specifically, in step 1, after crack images are collected, the concrete crack images are manually classified, which include: images of a transverse crack, a vertical crack, an oblique crack, a mesh crack, an irregular crack, a hole, and a background, as shown in FIG. 2. Hole-augmentation is to manually augment a hole concrete crack data set on the basis of a digital image processing technology (random pixel addition, color temperature change, perspective transformation, horizontal flipping, random pixel zeroing, motion blur, gaussian noise, unequal scaling or other technologies are randomly combined to act on an original hole crack map), and then augmented data is merged into an original hole crack class data set, so as to solve a problem of scarce data. An evaluation criterion of crack types of a transverse crack, a vertical crack and an oblique crack of concrete is as shown in FIG. 3. The training set and the validation set include class labels corresponding to the above 7 types of images and image types, which include 10,000 images in total, the number of each type of images is basically the same, and a ratio of the number of images in the training set to the validation set is 7:3.

Specifically, in step 2, pre-processing of the training set includes random image horizontal flipping and image normalization, where an average value required for normalization is set as [0.485, 0.456, 0.406], and a variance is set as [0.229, 0.224, 0.225]. Pre-processing of the validation set includes normalization, where parameters are set as [0.485, 0.456, 0.406] and [0.229, 0.224, 0.225].

Figure 4A:
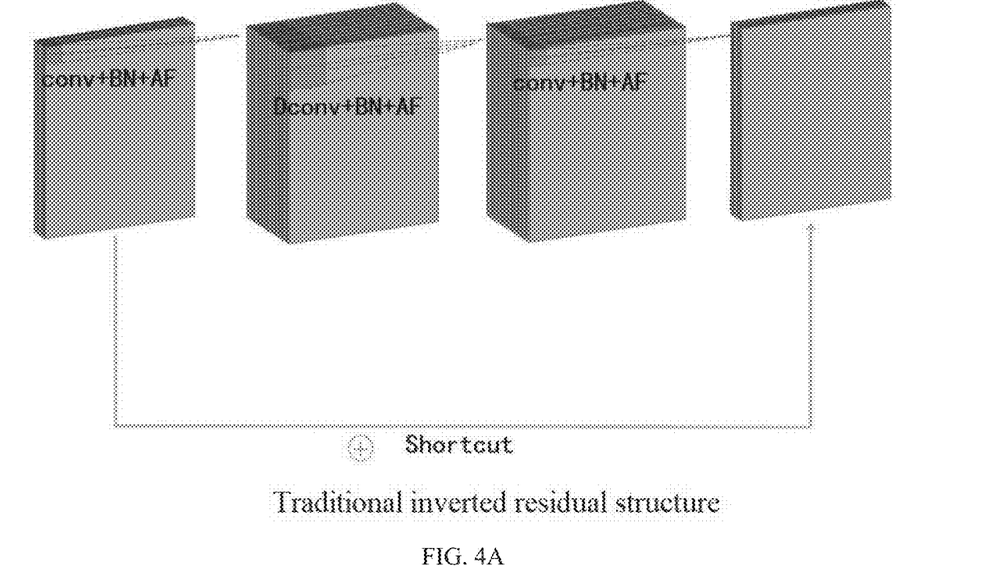
FIGS. 4A and 4B are comparison diagrams of a traditional inverted residual structure and a combination of an inverted residual structure and an efficient channel attention (ECA) attention mechanism according to Example 1 of the present invention.
Figure 4B:
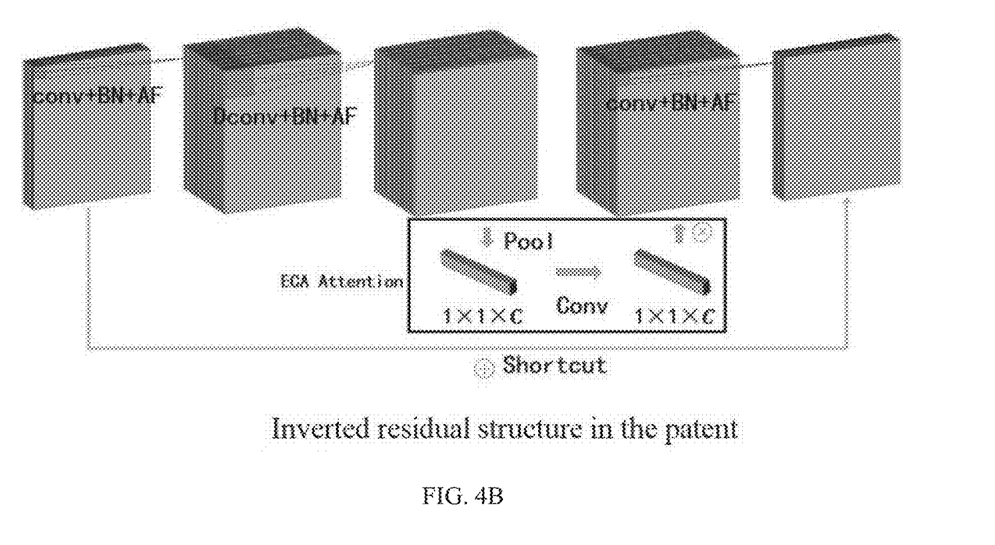
Figure 5:
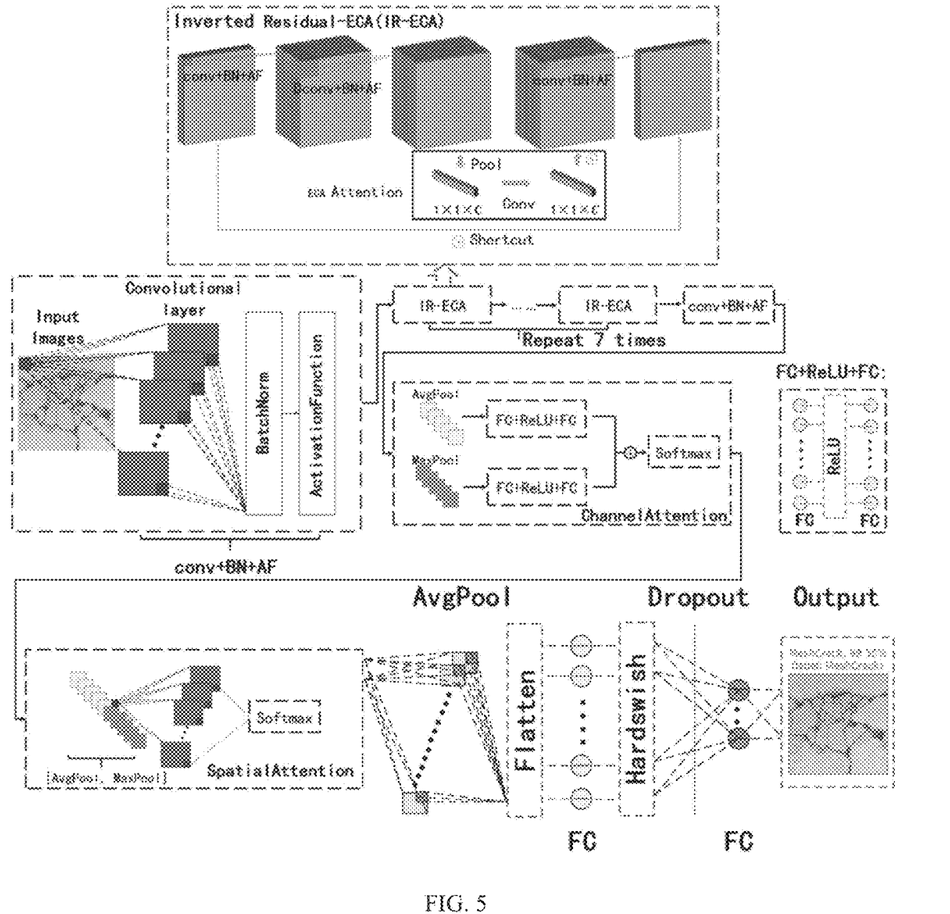
FIG. 5 is a schematic structural diagram of an IR7-EC network according to Example 1 of the present invention.

In the example, the step of building a neural network model in step 3 includes the following step:
  13 layers of network frameworks connected sequentially are established, as shown in FIG. 5. Specific internal parameters are as shown in Table 2, where conv2d represents a convolutional layer, pool represents a pooling layer, NBN represents no batch normalization layer, HS represents a hardswish activation function, RE represents a ReLU6 activation function, and k represents the number of crack types.

and 4B. The inverted residual-ECA structure specifically includes four parts: a first part including a convolutional layer with a convolutional kernel of 1×1, a batch normalization layer, and an ReLU6 activation function; a second part including a convolutional layer with a convolutional kernel of 3×3, a batch normalization layer, and an ReLU6 activation function; a third part being an ECA attention mechanism, a structure of which includes an average pooling layer, a convolutional layer with a convolutional kernel of 1×1, and a sigmoid function; and a fourth part structurally including a convolutional layer with a convolutional kernel of 1×1, a batch normalization layer, and a linear activation function.

A 9th layer includes a convolutional layer with a convolutional kernel of 3×3, a batch normalization layer and a hardswish activation function, a step size being 1, the number of input channels being 96, and the number of output channels being 576.

A 10th layer is the CBAM attention mechanism and specifically includes two parts: a first part being a channel attention mechanism, which includes an average pooling layer, a maximum pooling layer, the fully connected layer 1, an ReLU6 activation function, the fully connected layer 2, and a sigmoid function; and a second part being a space attention mechanism, which includes an average pooling layer, a maximum pooling layer, a convolutional layer with a convolutional kernel of 7×7, and a sigmoid function.

A 11th layer is an average pooling layer.

A 12th layer is a one-dimensional convolutional layer, a hardswish activation function, and a dropout layer with a sparsity ratio of 0.2.

A 13th is a one-dimensional convolutional layer.

With reference to FIG. 1, the step that image sample data is input into a neural network model so as to train the neural network model includes the following steps:

TABLE 2

IR7-EC network structure and specific internal parameters

| Input image (Length, width, the number of channels) | Operation name, convolutional #Z,899, size | Expansion multiple | The number of output channels | Whether to use an ECA attention mechanism | Nonlinear activation function | Step size |
|---|---|---|---|---|---|---|
| 224 × 224 × 3 | conv2d | \ | 16 | \ | HS | 2 |
| 112 × 112 × 16 | Inverted Residual-BCA, 3 × 3 | 16 | 16 | \ | RE | 2 |
| 56 × 56 × 16 | Inverted Residual-BCA, 3 × 3 | 72 | 24 | \ | RE | 2 |
| 28 × 28 × 24 | Invented Residual-BCA, 5 × 5 | 88 | 24 | ✓ | RE | 1 |
| 28 × 28 × 24 | Inverted Rasidual-BCA, 3 × 3 | 96 | 40 | \ | HS | 2 |
| 14 × 14 × 46 | Inverted Residual-BCA, 3 × 3 | 240 | 48 | ✓ | HS | 1 |
| 14 × 14 × 48 | Inverted Residual-BCA, 5 × 5 | 288 | 96 | ✓ | HS | 2 |
| 7 × 7 × 96 | Inverted Residual-BCA, 5 × 5 | 576 | 96 | ✓ | HS | 1 |
| 7 × 7 × 96 | conv2d, 1 × 1 | \ | 576 | ✓ | HS | 1 |
| | Channel Attention | | | | | |
| | Spatial Attention | | | | | |
| 7 × 7 × 576 | pool, 7 × 7 | \ | \ | \ | \ | 1 |
| 1 × 1 × 576 | conv2d, 1 × 1, NBN.dropout | \ | 512 | \ | HS | 1 |
| 1 × 1 × 1024 | conv2d, 1 × 1, NBN | \ | k | \ | \ | 1 |

A 1st layer includes a convolutional layer with a convolutional kernel of 3×3, a batch normalization layer, and a hardswish activation function, a step size being 2, the number of input channels being 3, and the number of output channels being 16.

A 2nd layer to an 8th layer are the inverted residual-efficient channel attention (ECA) structures. Comparison between the inverted residual-ECA structure and a traditional inverted residual structure is as shown in FIGS. 4A pre-processed image sample data is input into the 1st layer, and preliminary feature extraction, data normalization and nonlinear transformation are conducted on the image sample data sequentially through the convolutional layer, the batch normalization layer and the hardswish activation function;

a feature preliminarily extracted through the 1st layer is input into the 2nd layer to the 8th layer, the feature sequentially passes the 7 inverted residual-ECA structures, data is input into the first part of the inverted residual-ECA structure for processing so as to augment a dimension of an input data channel, an augmentation multiple being the expansion multiple as shown in Table 1, data after channel dimension augmentation is input into the second part so as to conduct deep feature extraction, data after deep feature extraction is input into the third part, some channels with higher network precision are highlighted by weighting network channels through the ECA attention mechanism, so as to obtain an enhanced concrete crack feature extraction map, the enhanced concrete crack feature extraction map is input into the fourth part so as to reduce a dimension of a data channel, the number of channels may decrease to the number of output channels in Table 1, when the number of input channels is equal to the number of output channels and the step size is 1, the inverted residual-ECA structure may be connected in a shortcut manner, and the data may pass all the inverted residual-ECA structures sequentially according to similar operations;

the data obtained through the 2nd layer to the 8th layer is input into the 9th layer for feature extraction;

data after feature extraction through the 9th layer is input into the CBAM attention mechanism of the 10th layer, and feature extraction at a channel and space level is further conducted on the data, so as to obtain a feature extraction map containing more crack information;

the feature extraction map containing more crack information obtained through the 10th layer is input into the 11th layer, the 12th layer and the 13th layer sequentially so as to conduct data dimension reduction and two-dimensional to one-dimensional transformation, and an input concrete crack image is identified according to extracted one-dimensional crack image feature information, so as to output an classification result; and the classification result obtained through the 12th layer is compared with a true result, an error is computed through a loss function, and a network parameter is updated through an optimization function until a network is fitted.

Specifically, in order to prevent a vanishing network gradient, normalization of the batch normalization layer in each layer is conducted through the following formulas:

$$\mu_\mathcal{B} = \frac{1}{m}\sum_{i=1}^{m} x_i$$

$$\sigma_\mathcal{B}^2 = \frac{1}{m}\sum_{i=1}^{m} (x_i - \mu_\mathcal{B})^2$$

$$\hat{x}_i = \frac{x_i - \mu_\mathcal{B}}{\sqrt{\sigma_\mathcal{B}^2 + \epsilon}}$$

$$y_i \leftarrow \gamma \hat{x}_i + \beta$$

where $x_i$ is a feature map before input into batch normalization, $y_i$ is a feature map after output from batch normalization, m is the number of feature maps input into the layer in a current training batch, and $\gamma$ and $\beta$ are variables that change with update of a network gradient.

Specifically, data passing the ReLU6 activation function in each layer is processed nonlinearly through the following formula:

$$f(x_i) = \min(\max(x_i, 0), 6)$$

where $x_i$ is a feature map before input into the ReLU6 activation function, and $f(x_i)$ is a feature map after output from the ReLU6 activation function.

Specifically, data passing the hardswish activation function in each layer is processed nonlinearly through the following formula:

$$Hardswish(x) = \begin{cases} 0 & \text{if } x \leq -3 \\ x & \text{if } x \geq +3 \\ x \cdot (x+3)/6 & \text{otherwise} \end{cases}$$

where x is a feature map before input into the hardswish activation function, and f(x) is a feature map after output from the hardswish activation function.

Specifically, cross-channel interaction is conducted on data passing the ECA attention mechanism in each layer, so as to obtain the enhanced concrete crack feature extraction map, by using the following formula:

$$k = \psi(C) = \left| \frac{\log_2(C)}{\gamma} + \frac{b}{\gamma} \right|_{odd},$$

$$E_s(F) = \sigma\left(f^{k*k}[AvgPool(F)]\right)$$

where $|t|_{odd}$ represents a nearest odd t; C is the number of channels of data input into the ECA attention mechanism, and $\gamma$ and B are two hyper-parameters, $\gamma$ being 2, and b being 1; and $E_s(F)$ is the ECA attention mechanism, $\sigma$ is a sigmoid operation, $f^{k*k}[.]$ represents a convolutional operation of k*k, F is an input feature map, and AvgPool( ) is average pooling.

Specifically, average pooling and maximum pooling are used to aggregate space information of feature mapping, a space dimension of an input feature map is compressed, and summation and merging are conducted element by element, so as to generate a channel attention map, through the following formula.

$$M_c(F) = \sigma(MLP(AvgPool(F)) + MLP(MaxPool(F)))$$

where $M_c$ represents channel attention, MLP( ) is composed of the fully connected layer 1, the ReLU6 activation function, and the fully connected layer 2, $\sigma$ is a sigmoid operation, F is an input feature map, AvgPool( ) is average pooling, MaxPool( ) is maximum pooling, and $M_s$ represents the space attention mechanism.

Specifically, average pooling and maximum pooling are used to compress the input feature map in a space attention module, so as to obtain the feature extraction map containing more crack information through the following formula.

$$M_s(F) = \sigma(f^{7*7}[AvgPool(F), MaxPool(F)])$$

where $M_s$ represents the space attention mechanism, $\sigma$ is a sigmoid operation, $f^{7*7}[\ ]$ represents a convolutional operation of 7*7, F is an input feature map, AvgPool( ) is average pooling, and MaxPool( ) is maximum pooling.

Specifically, sparsification is conducted on data passing the dropout layer in each layer, so as to avoid network over-fitting through the following formulas:

$$r_j^{(l)} \sim \text{Bernoulli}(p)$$

$$\tilde{y}^{(l)} = r^{(l)} * y^{(l)}$$

where a Bernoulli(p) function is used to generate a vector of a probability $r_j^{(l)}$, such that a neuron stops working with probability p, $y^{(l)}$ is an upper layer of an output feature map, and $\tilde{y}^{(l)}$ is a feature map output after passing the dropout layer.

Specifically, loss of a network is computed through the following formula:

$$\text{Loss}(y_{o,c}, p_{o,c}) = -\sum_{c=1}^{M} y_{o,c} \log(p_{o,c})$$

where $\text{Loss}(y_{o,c}, p_{o,c})$ is a loss function between a network predicted value and a true value, M is the number of classes, 7 and $y_{o,c}$ are true values, and $p_{o,c}$ is the network predicted value.

Specifically, internal parameters of a network are optimized through the following formulas:

$$f(\theta) = \text{Loss}(y_{o,c}, p_{o,c})$$

$$g_t = \nabla_\theta f_t(\theta_{t-1})$$

$$m_t = \beta_1 \cdot m_{t-1} + (1-\beta_1) \cdot g_t$$

$$v_t = \beta_2 \cdot v_{t-1} + (1-\beta_2) \cdot g_t^2$$

$$\hat{m}_t = m_t / (1-\beta_1^t)$$

$$\hat{v}_t = v_t / (1-\beta_2^t)$$

$$\theta_t = \theta_{t-1} - \alpha \cdot \hat{m}_t / (\sqrt{\hat{v}_t} + \epsilon)$$

where $\text{Loss}(y_{o,c}, p_{o,c})$ is a loss function between a network predicted value and a true value, θ is a parameter to be updated in a model, $g_t$ is a gradient obtained by conducting derivation on θ of the loss function f(θ), $\beta_1$ is a first-order moment attenuation coefficient, $\beta_2$ is a second-order moment attenuation coefficient, $m_t$ is an expectation of the gradient $g_t$, $v_t$ is an expectation of $g_t^2$, $\hat{m}_t$ is an offset correction of $m_t$, $\hat{v}_t$ is an offset correction of $v_t$, $\theta_{t-1}$ is a parameter before network update, and $\theta_t$ is a parameter after network update.

Figure 6:
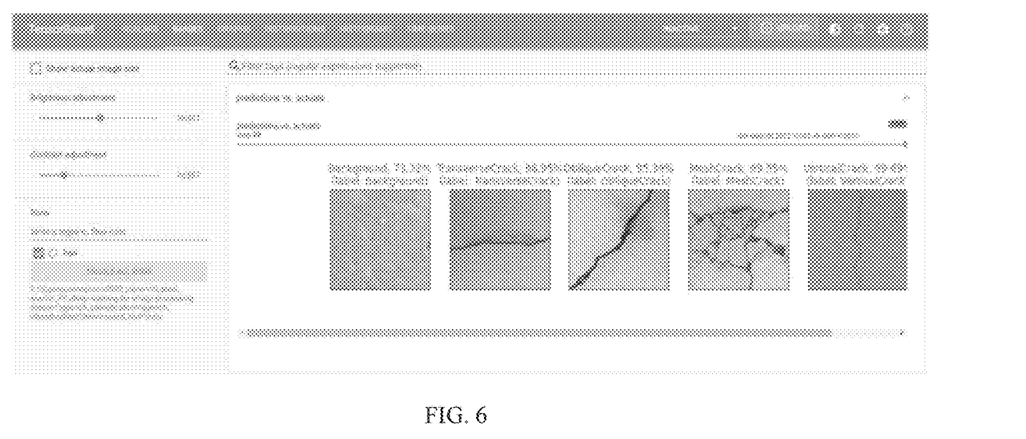
FIG. 6 shows visual maps of crack results identified by using an IR7-EC network according to Example 1 of the present invention.
Figure 7A:
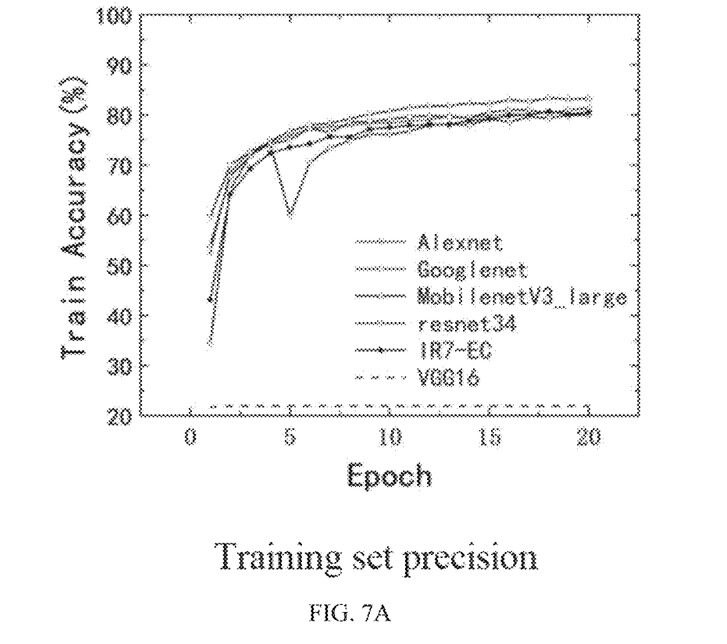
FIGS. 7A-7D show comparison diagrams of training results between an IR7-EC model and different convolutional neural network (CNN) models.
Figure 7B:
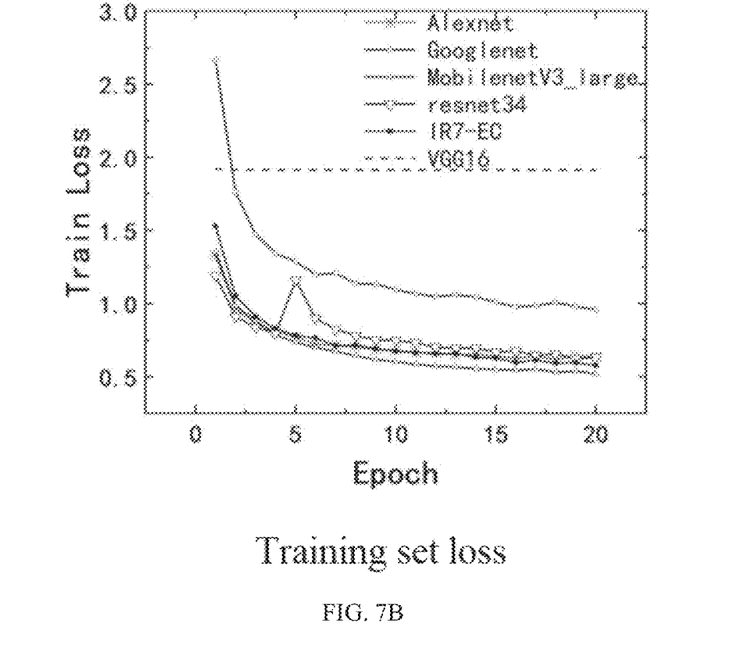
Figure 7C:
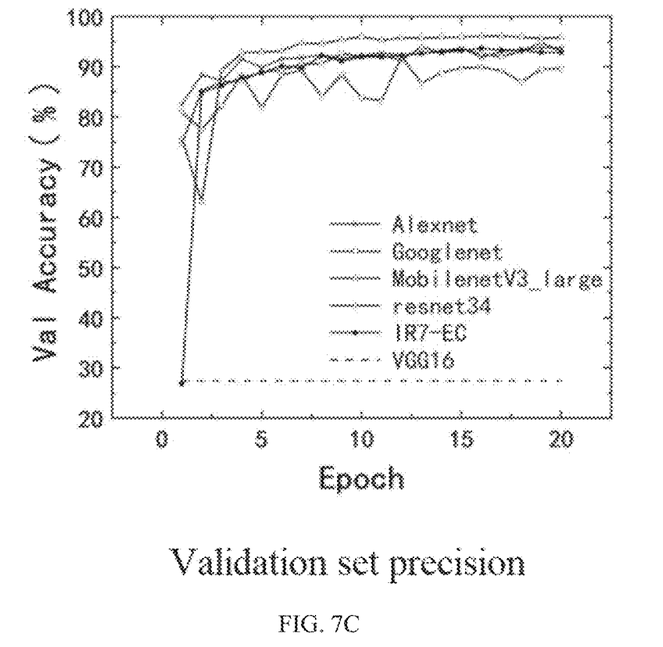
Figure 7D:
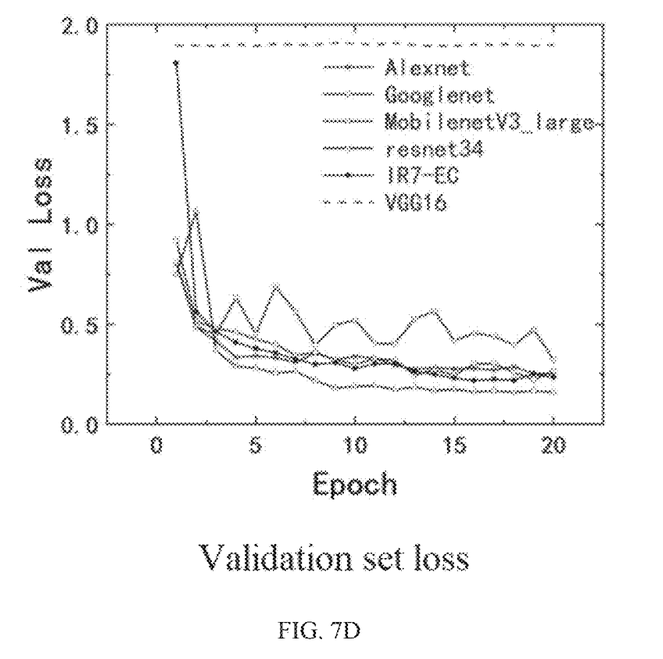
Figure 8A:
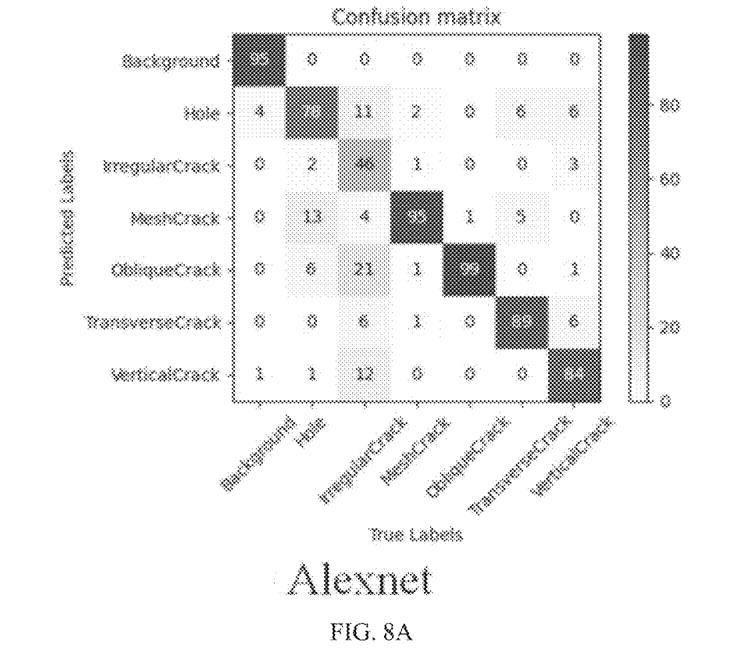
FIGS. 8A-8F show comparison diagrams of confusion matrices of test set results between an IR7-EC model and different CNN models.
Figure 8B:
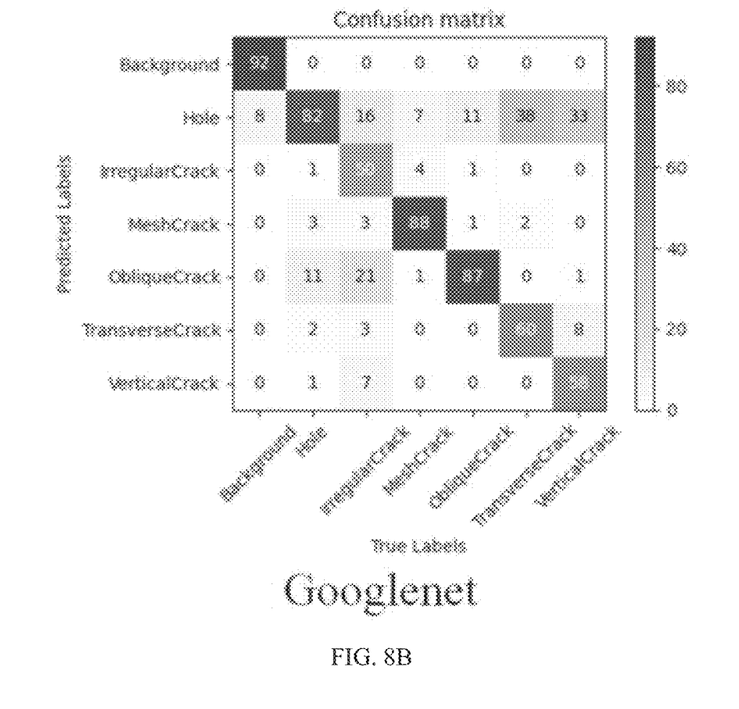
Figure 8C:
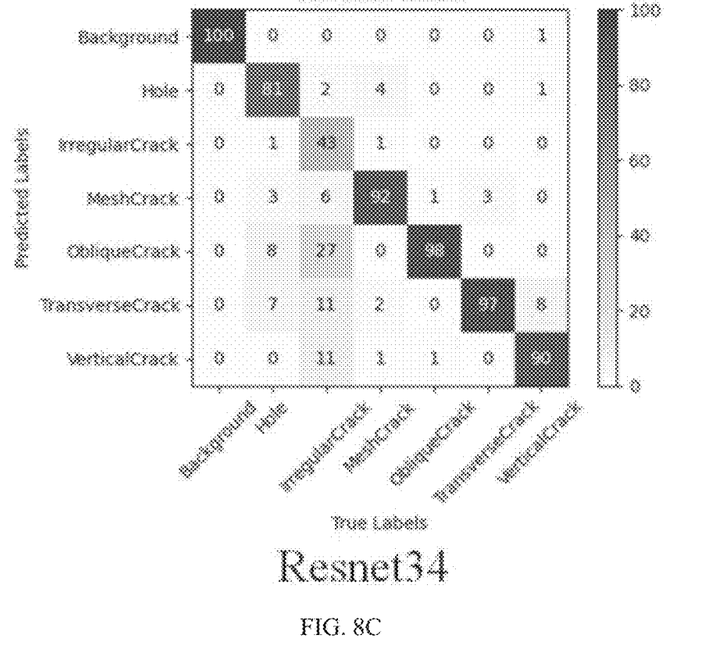
Figure 8D:
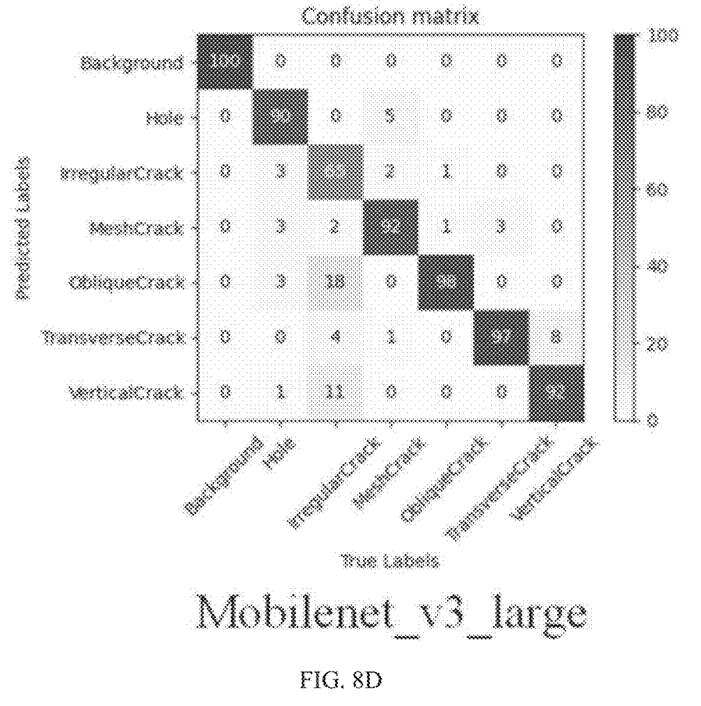
Figure 8E:
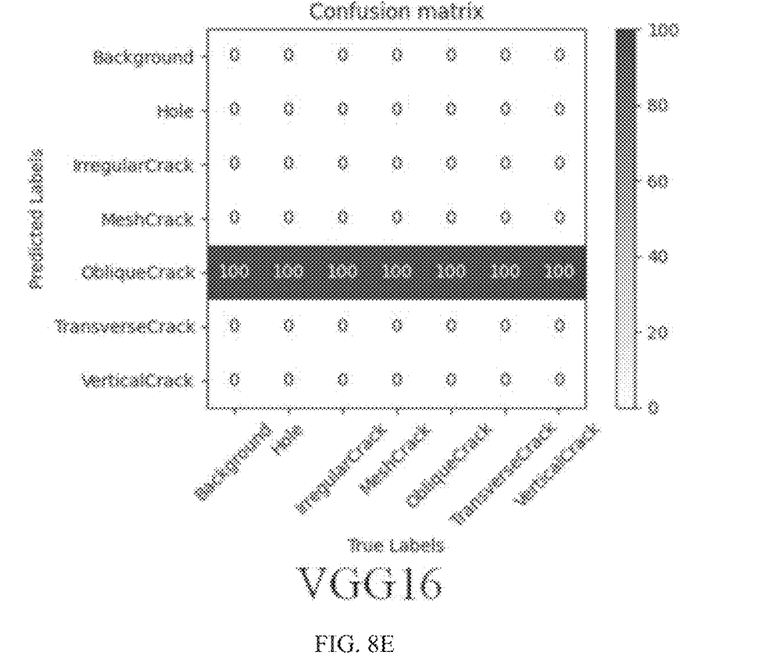
Figure 8F:
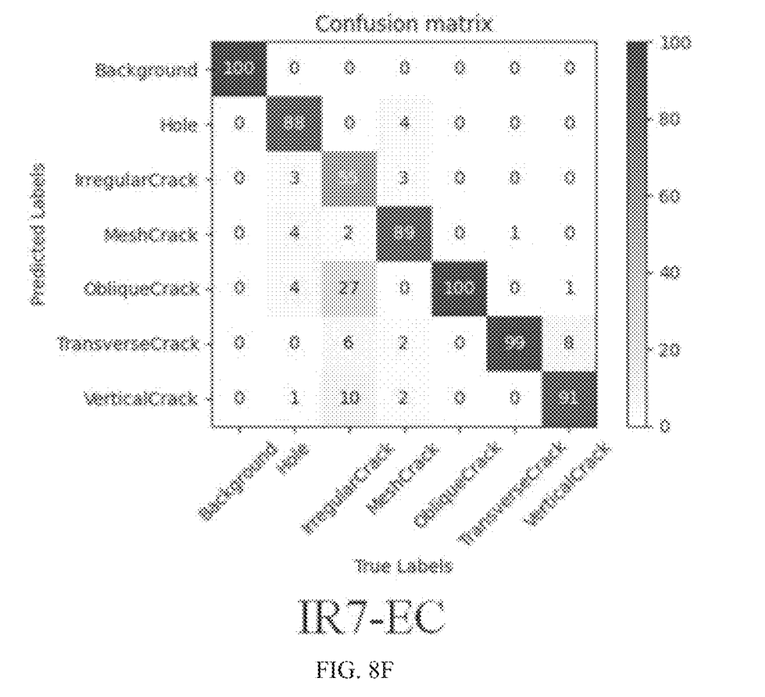

An actually-shot concrete image is used as a training set and input the well trained network, and finally, a classification result of a concrete crack image is output. FIG. 6 shows classification results of some cracks obtained through a tensorboard visualization tool.

With reference to FIG. 1, in the example, the IR7-EC network disclosed herein and current general neural networks including alexnet, googlenet, vgg16, resnet34 and Mobilenetv3_large that also contains a large number of inverted residual structures are trained separately, and cracks in a concrete crack image test set are identified through the above networks after 20 epochs of training. Precision and loss curves of a training set and a validation set of each model are shown in FIGS. 7A-7D. Final results of a training set, a validation set and a test set of each model are shown in Table 3, where precision and errors of the training set represent a theoretical classification ability of a network after concrete crack training, and precision and errors of the validation set represent an actual classification ability. The higher the precision of the validation set, the lower the error, and the stronger the actual classification ability of the network. A computation formula of precision is as follows:

Table 4 shows the number of parameters and operations of an IR7-EC network and other convolutional neural networks (CNNs), where Flops is the number of floating points of operations, which include all multiplication and addition operations in the network model and used to measure computational complexity of the model. According to results in Table 3, Table 4 and FIGS. 7A-7D, it may be seen that, compared with other networks, concrete crack classification precision and errors of the IR7-EC network disclosed herein are very close to those of Mobilenetv3_large and are greater than those of other compared network models. Meanwhile, for the disclosed network, the number of parameters and operations, a model size and model training time are greatly reduced, and occupied memory is much lower than that of other compared network models except Alexnet. Due to a serious vanishing gradient problem, precision and loss of VGG16 stop changing. With a Resnet34 network as an example, a size of the IR7-EC network model disclosed herein is only 4.09 MB, which is 19.88 times smaller than that of the Resnet34 network. For the disclosed network model, the number of parameters is reduced by 20 times, training time of 20 epochs is shortened by 5.9 times, Flops is reduced by 77.9 times, and meanwhile, higher concrete classification precision and less errors are achieved. With Mobilenetv3_large including inverted residual structures as an example, for the IR7-EC network model disclosed herein, a size is reduced by 3.95 times, the number of parameters is reduced by 4.02 times, training time of 20 epochs is shortened by 1.9 times, Flops is reduced by 4.8 times, and meanwhile, similar concrete classification precision and less errors are achieved.

Reference is made to FIGS. 8A-8F and Table 5 for comparison of classification results of a test set (including 100 crack images of each class). FIGS. 8A-8F show confusion matrices of classification results of test sets of an IR7-EC model and different CNN models, where an ordinate of a matrix being a predicted value, an abscissa of a matrix is a true value, the sum of each row of values represents the number of network predicted samples of the class, and the sum of each column of values represents the number of samples of a true class, such that the larger a value on a diagonal of a matrix, the closer a network predicted value of the class is to a true value. Table 5 shows precision, recall rates and specificity of test sets of an IR7-EC network and other CNN classification networks. The precision is a ratio of samples correctly determined to all predicted positive samples. The higher the precision, the lower a possibility of network reporting errors. A computation formula of precision is as follows:

$$\text{Precision} = \frac{TP}{TP + FP}$$

The recall (true positive rate) is a ratio of all positive samples predicted correctly to all actual positive samples. The higher the recall rate, the lower a possibility of network reporting missing. A computation formula of the recall rate is as follows:

$$\text{Recall} = \frac{TP}{TP + FN}$$

The specificity (true negative rate) is a ratio of all negative samples predicted correctly to all actual negative samples. A computation formula of the specificity is as follows.

$$Specificity = \frac{TN}{TN + FP}$$

Reference is made to Table 6 for TP, TN, FP and FN. The second letter includes positive (P) and negative (N), which are used to represent a predicted condition, and the first letter includes true (T) and false (F), which are used to determine an actual condition. Specifically, TP indicates that a network determines that the sample is a positive sample, and the determination is correct (in fact, the sample is positive);

TN indicates that a network determines that the sample is a negative sample, and the determination is correct (in fact, the sample is negative);

FP indicates that a network determines that the sample is a positive sample, and the determination is false (in fact, the sample is negative); and FN indicates that a network determines that the sample is a negative sample, and the determination is false (in fact, the sample is positive).

With reference to Table 5 and FIGS. 8A-8F, in the test set classification results of all the network models, all the CNNs have a slightly lower ability to classify irregular cracks. In Table 5, except for IR7-EC and Mobilenetv3_large, a recall rate of irregular cracks of the other CNNs is smaller than 0.5. In conclusion, the IR7-EC network model disclosed herein not only has a very light weight, but is comparable to Mobilenetv3_large and is stronger than the other compared CNNs, in test set performance.

TABLE 3

Classification precision and loss values of an IR7-EC network and other CNNs after 20 iterations

| | Precision | | Loss value | | Test set |
|---|---|---|---|---|---|
| Item | Training set (%) | Validation set (%) | Training set | Validation set | precision (%) |
| IR7-EC | 80.5 | 92.9 | 0.57 | 0.23 | 89.5 |
| Alexnet | 80 | 93.7 | 0.63 | 0.25 | 83.1 |
| VGG16 | 21.9 | 27.4 | 1.91 | 1.9 | 14.2 |
| Googlenet | 81.3 | 93 | 0.95 | 0.27 | 73.1 |
| Resnet34 | 80.9 | 89.2 | 0.61 | 0.32 | 85.4 |
| Mobilenetv3_large | 83.2 | 95.8 | 0.52 | 0.16 | 90 |

TABLE 4

The number of parameters and operations of an IR7-EC network and other CNNs

| Item | (Total params) | Total memory (MB) | Total Flops (Flops) | weight file size (MB) | sum time of training (s) |
|---|---|---|---|---|---|
| IR7-EC | 1,048,448 | 13.66 | 47.3M | 4.09 | 765.45 |
| Alexnet | 14,595,783 | 2.77 | 310.07M | 55.6 | 1526.51 |
| VGG16 | 134,289,223 | 109.29 | 15.5G | 512 | 13230.2 |
| Googlenet | 5,980,727 | 30.03 | 1.59G | 39.4 | 1689.68 |
| Resnet34 | 21,288,263 | 37.61 | 3.67G | 81.3 | 4521.46 |
| Mobilenetv3_large | 4,210,999 | 50.39 | 226.44M | 16.2 | 1458.53 |

TABLE 5

Comparison of precision, recall rates and specificity of test sets of an IR7-EC network and other CNN classification networks

| IR7-EC | Precision | Recall | Specificity | vgg16 | Precision | Recall | Specificity |
|---|---|---|---|---|---|---|---|
| Background | 1 | 1 | 1 | Background | 0 | 0 | 1 |
| Hole | 0.957 | 0.88 | 0.993 | Hole | 0 | 0 | 1 |
| IrregularCrack | 0.902 | 0.55 | 0.99 | IrregularCrack | 0 | 0 | 1 |
| MeshCrack | 0.927 | 0.89 | 0.988 | MeshCrack | 0 | 0 | 1 |
| ObliqueCrack | 0.758 | 1 | 0.947 | ObliqueCrack | 0.143 | 1 | 0 |
| TransverseCrack | 0.861 | 0.99 | 0.973 | TransverseCrack | 0 | 0 | 1 |
| VerticalCrack | 0.875 | 0.91 | 0.978 | VerticalCrack | 0 | 0 | 1 |
| Mobilenety3large | Precision | Recall | Specificity | googleNet | Precision | Recall | Specificity |
| Background | 1 | 1 | 1 | Background | 1 | 0.92 | 1 |
| Hole | 0.947 | 0.9 | 0.992 | Hole | 0.421 | 0.82 | 0.812 |
| IrregularCrack | 0.915 | 0.65 | 0.99 | IrregularCrack | 0.893 | 0.49 | 0.99 |
| MeshCrack | 0.911 | 0.92 | 0.985 | MeshCrack | 0.907 | 0.88 | 0.985 |
| ObliqueCrack | 0.824 | 0.98 | 0.965 | ObliqueCrack | 0.719 | 0.87 | 0.943 |
| TransverseCrack | 0.882 | 0.97 | 0.978 | TransverseCrack | 0.822 | 0.6 | 0.978 |
| VerticalCrack | 0.885 | 0.92 | 0.98 | VerticalCrack | 0.879 | 0.58 | 0.987 |

TABLE 5-continued

Comparison of precision, recall rates and specificity of test sets of an IR7-EC network and other CNN classification networks

| resNet34 | Precision | Recall | Specificity | AlexNet | Precision | Recall | Specificity |
|---|---|---|---|---|---|---|---|
| Background | 0.99 | 1 | 0.998 | Background | 1 | 0.95 | 1 |
| Hole | 0.92 | 0.81 | 0.988 | Hole | 0.729 | 0.78 | 0.952 |
| IrregularCrack | 0.956 | 0.43 | 0.997 | IrregularCrack | 0.885 | 0.46 | 0.99 |
| MeshCrack | 0.876 | 0.92 | 0.978 | MeshCrack | 0.805 | 0.95 | 0.962 |
| ObliqueCrack | 0.737 | 0.98 | 0.942 | ObliqueCrack | 0.773 | 0.99 | 0.952 |
| TransverseCrack | 0.776 | 0.97 | 0.953 | TransverseCrack | 0.873 | 0.89 | 0.978 |
| VerticalCrack | 0.874 | 0.9 | 0.978 | VerticalCrack | 0.857 | 0.84 | 0.977 |

TABLE Meanings of TP, TN, FP, and FN

| Evaluation index | | Prediction result | |
|---|---|---|---|
| | | Positive sample | Negative sample |
| Actual condition | Positive sample | TP | FN |
| | Negative sample | FP | TN |

The above descriptions are merely preferred examples of the present invention, and are not intended to limit the present invention. Any modifications, equivalent replacements and improvements made within the spirit and principle of the present invention should fall within the protection scope of the present invention.

What is claimed is:

1. A quick and intelligent IR7-EC network based classification method for the concrete image crack type, integrating attention mechanisms, inverted residual blocks, pooling layers, and fully connected layers through precisely configured structural quantities, combinations, and connections:
the 1st layer comprises a convolutional layer with a convolutional kernel of 3×3, a batch normalization layer, and a hardswish activation function, a step size being 2, a number of input channels being 3, and a number of output channels being 16;
from the 2nd to the 8th layer are seven inverted residual-ECA structures, and each layer comprises four parts:
(i) a convolutional layer with a convolutional kernel of 1×1, a batch normalization layer, and an ReLU6 activation function;
(ii) a depthwise separatable convolution layer with a kernel of 3×3, a batch normalization layer, and an ReLU6 activation function;
(iii) an ECA attention mechanism, wherein a structure of the ECA attention mechanism comprises an average pooling layer, a convolutional layer with a convolutional kernel of 1×1, and a sigmoid function; and
(iv) a convolutional layer with a convolutional kernel of 1×1, a batch normalization layer, and a linear activation function;
the 9th layer comprises a convolutional layer with a convolutional kernel of 3×3, a batch normalization layer and a hardswish activation function, a step size being 1, a number of input channels being 96, and a number of output channels being 576;
the 10th layer is the CBAM attention mechanism and comprises two parts:
(i) the first part being: a channel attention mechanism, wherein the channel attention mechanism comprises an average pooling layer, a maximum pooling layer, a first fully connected layer, an ReLU6 activation function, a second fully connected layer, and a sigmoid function; and
(ii) the second part being: a space attention mechanism, wherein the space attention mechanism comprises an average pooling layer, a maximum pooling layer, a convolutional layer with a convolutional kernel of 7×7, and a sigmoid function;
the 11th layer is an average pooling layer;
the 12th layer is a one-dimensional convolutional layer, a hardswish activation function, and a dropout layer with a sparsity ratio of 0.2; and
the 13th is a one-dimensional convolutional layer.

2. The quick and intelligent IR7-EC network based classification method for the concrete image crack type according to claim 1, wherein
training of the IR7-EC network model comprises:
collecting crack images, establishing an image data set of different crack types, and conducting pre-processing to obtain a pre-processed image data set;
inputting the pre-processed image data set into the 1st layer, and conducting preliminary feature extraction, data normalization and nonlinear transformation on image sample data sequentially through the convolutional layer, the batch normalization layer and the hardswish activation function;
inputting a feature preliminarily extracted through the 1st layer into the 2nd layer to the 8th layer, allowing the feature to sequentially pass the 7 inverted residual-ECA structures, inputting the feature into the first part of the inverted residual-ECA structure for processing so as to augment a dimension of an input data channel, inputting data after channel dimension augmentation into the second part so as to conduct deep feature extraction, inputting data after deep feature extraction into the third part, highlighting a plurality of channels with higher network precision by weighting network channels through the ECA attention mechanism, so as to obtain the enhanced concrete crack feature extraction map, inputting the enhanced concrete crack feature extraction map into the fourth part so as to reduce a dimension of a data channel, and allowing the data to pass all the 7 inverted residual-ECA structures sequentially according to similar operations;
inputting the data obtained through the 2nd layer to the 8th layer into the 9th layer for feature extraction;
inputting data after feature extraction through the 9th layer into the CBAM attention mechanism of the 10th layer, and further conducting feature extraction at the channel and space level on the data, so as to obtain the feature extraction map containing more crack information;

inputting the feature extraction map obtained through the 10th layer into the 11th layer, the 12th layer and the 13th layer sequentially so as to conduct data dimension reduction and two-dimensional to one-dimensional transformation, and classifying the input concrete crack image according to the extracted one-dimensional crack image feature information, so as to output the classification result; and comparing the classification result obtained through the 12th layer and a true result, computing an error through a loss function, and updating a network parameter through an optimization function until a network is fitted.

3. The quick and intelligent IR7-EC network based classification method for the concrete image crack type according to claim 1, wherein normalization of the batch normalization layer comprises:

$$\mu_\mathcal{B} = \frac{1}{m}\sum_{i=1}^{m} x_i$$

$$\sigma_\mathcal{B}^2 = \frac{1}{m}\sum_{i=1}^{m}(x_i - \mu_\mathcal{B})^2$$

$$\hat{x}_i = \frac{x_i - \mu_\mathcal{B}}{\sqrt{\sigma_\mathcal{B}^2 + \epsilon}}$$

$$y_i \leftarrow \gamma \hat{x}_i + \beta$$

wherein $x_i$ is a feature map before input into batch normalization, $y_i$ is a feature map after output from batch normalization, m is a number of feature maps input into the layer in a current training batch, and $\gamma$ and $\beta$ are variables and change with update of a network gradient;

data passing the ReLU6 activation function is processed nonlinearly through the following formula: $f(x_i)$=min (max $(x_i,0),6$)

wherein $x_i$ is a feature map before input into the ReLU6 activation function, and $f(x_i)$ is a feature map after output from the ReLU6 activation function; and data passing the hardswish activation function is processed nonlinearly through the following formula:

$$Hardswish(x) = \begin{cases} 0 & \text{if } x \leq -3 \\ x & \text{if } x \geq +3 \\ x \cdot (x+3)/6 & \text{otherwise} \end{cases}$$

wherein x is a feature map before input into the hardswish activation function, and f(x) is a feature map after output from the hardswish activation function.

4. The quick and intelligent IR7-EC network based classification method for the concrete image crack type according to claim 1, wherein the step of highlighting the plurality of channels with higher network precision by weighting the network channels through the ECA attention mechanism, so as to obtain the enhanced concrete crack feature extraction map comprises:

conducting cross-channel interaction on data passing the ECA attention mechanism in each layer, so as to obtain the enhanced concrete crack feature extraction map, by using the following formula:

$$k = \psi(C) = \left| \frac{\log_2(C)}{\gamma} + \frac{b}{\gamma} \right|_{odd}$$

$$E_s(F) = \sigma\left(f^{k*k}[AvgPool(F)]\right)$$

wherein $|t|_{odd}$ represents a nearest odd t; C is a number of channels of data input into the ECA attention mechanism, and $\gamma$ and b are two hyper-parameters, $\gamma$ being 2, and b being 1; and $E_s(F)$ is the ECA attention mechanism, $\sigma$ is a sigmoid operation, $f^{k*k}[\bullet]$ represents a convolutional operation of k*k, F is an input feature map, and AvgPool( ) is average pooling.

5. The quick and intelligent IR7-EC network based classification method for the concrete image crack type according to claim 1, wherein the step of inputting data after feature extraction through the 9th layer into the CBAM attention mechanism of the 10th layer, and further conducting feature extraction at the channel and space level on the data, so as to obtain the feature extraction map containing more crack information comprises:

using average pooling and maximum pooling to aggregate space information of feature mapping, compressing a space dimension of an input feature map, and conducting summation and merging element by element, so as to generate a channel attention map, through the following formula:

$$M_c(F)=\sigma(MLP(AvgPool(F))+MLP(MaxPool(F)))$$

wherein Me represents channel attention, MLP( ) is composed of the first fully connected layer, the ReLU6 activation function, and the second fully connected layer, $\sigma$ is a sigmoid operation, F is an input feature map, AvgPool( ) is average pooling, MaxPool( ) is maximum pooling, and Ms represents the space attention mechanism; and using average pooling and maximum pooling to compress the input feature map in a space attention module, so as to obtain the feature extraction map containing more crack information through the following formula:

$$M_s(F)=\sigma(f^{7*7}[AvgPool(F), MaxPool(F)])$$

wherein $M_s$ represents the space attention mechanism, $\sigma$ is a sigmoid operation, $f^{7*7}[\bullet]$ represents a convolutional operation of 7*7, F is the input feature map, AvgPool( ) is average pooling, and MaxPool( ) is maximum pooling.

6. The quick and intelligent IR7-EC network based classification method for the concrete image crack type according to claim 1, further comprising:

conducting sparsification on data passing the dropout layer in each layer, so as to avoid network over-fitting through the following formulas:

$$r_j^{(l)} \sim Bernoulli(p)$$

$$\tilde{y}^{(l)} = r^{(l)} * y^{(l)}$$

wherein a Bernoulli(p) function is used to generate a vector of a probability $r_j^{(l)}$, such that a neuron stops working with probability p, $y^{(l)}$ is an upper layer of an output feature map, and $\tilde{y}^{(l)}$ is a feature map output after passing the dropout layer.

* * * * *